Patented Jan. 28, 1941

2,229,876

UNITED STATES PATENT OFFICE 2,229,876

MANUFACTURE OF A COMPLEX ADSORBATE

Henry A. Smith, Berkeley, Calif., assignor, by mesne assignments, to National Oil Products Co., Harrison, N. J., a corporation of New Jersey No Drawing. Application August 13, 1937, Serial No. 158,953

6 Claims. (Cl. 167—81)

This invention relates to the manufacture of a vitamin adsorbate containing at least two vitamins which adsorbate is of a high plural vitamin potency per unit volume.

In manufacturing vitamin adsorbates containing two or more vitamins, the usual practice is to adsorb a vitamin on one adsorbent and then combine this with another adsorbent carrying another vitamin. While the result is satisfactory in that a plural vitamin content is contained in the mixture, the mass is of a low vitamin potency per unit volume, as can be readily appreciated, because of the use of separate masses of adsorbent for each vitamin. I have discovered that adsorbent materials selectively adsorb vitamins and that even though an adsorbent has practically exhausted its adsorbent capacity for a given vitamin, this adsorbent still has the capacity to adsorb an appreciable quantity of another vitamin. For example, I am able to successfully incorporate vitamins G and $B_1$ on the same adsorbent, thus reducing materially the unit volume of the adsorbate.

This selective adsorption enables a compound vitamin adsorbate to be manufactured in which the individual vitamins are present in selected values and at a high unit volume potency. For example 1500 gamma of riboflavin (also termed lactoflavin and vitamin G) per gram can be placed on an adsorbate per gram thereof while a comparable high $B_1$ value per gram can also be placed on the adsorbate.

As suitable adsorbent materials, I can use fuller's earth, bentonite, and other adsorbent earths, activated carbon and the like. These materials operate successfully in the liquid phase and in the presence of water.

Hereinafter I have disclosed the manufacture of an adsorbate containing lactoflavin and vitamin $B_1$. Of course, any other vitamin which is adsorbed on these materials can be substituted in place of these, these vitamins being mentioned as examples.

A suitable source of lactoflavin is skim milk and its products. The lactoflavin manufacturing operation of this invention includes precipitation of the casein from the skim milk by the addition of an acidifying medium as hydrochloric, sulfuric or lactic acid. This causes casein coagulation, the casein being separated from the remaining liquid, washed, dried, and ground for market. Albumen is removed by adjusting the pH of the remaining liquid to approximately 6.8, calcium hydroxide being used for this, and the material thereafter is brought to a boil. The albumen precipitates and floats to the surface of the liquid, from whence it is readily removed, dried and ground.

The residual liquor, now free from casein and albumen, is concentrated for milk sugar recovery. Either before or after the concentration step a preliminary vitamin G or lactoflavin adsorbate can be secured. For example, 40 pounds of fuller's earth is added to 1000 gallons of liquid prior to concentration. This mixture is agitated for about 20 minutes and then filtered, the filtrate being returned to the plant, where it goes into the next step, vacuum evaporation, for milk sugar production. The adsorbate removed from the filter press is washed, dried and ground in a ball mill, this concentrate containing approximately 60 gamma of riboflavin per gram.

Instead of the foregoing, the liquid, free from casein and albumen, can be concentrated in vacuum evaporators. Prior to transportation of the material to the milk sugar crystallizer, the material is contacted with fuller's earth to secure a first vitamin G adsorbate. This process has the advantage that the color of the subsequent sugar precipitated from the liquid is improved, a whiter sugar being obtained on the first precipitation when the fuller's earth treatment follows the concentration step.

It is also possible to recover the vitamin G by adsorption on fuller's earth from the mother liquor obtained from the lactose crystallizers. The milk sugar when delivered from the evaporators is in the form of a heavy syrup. This material is transferred to crystallizers in which the sugar is slowly crystallized. These crude crystals are separated from the mother liquor in the centrifuge. This mother liquor is reconcentrated and again crystallized to give as high a recovery of sugar as is possible. The mother liquor obtained by centrifuging the raw crystals is of a dark brown color containing some sugar and the minerals originally in the milk and any additional salts added in the process of manufacture together with the vitamin G contained in the milk. It is possible to treat this mother liquor with fuller's earth and secure an adsorbate containing up to 200–300 gamma of riboflavin per gram.

After the adsorbate has been prepared by any one of the foregoing processes, it should be thoroughly washed to free it from all occluded milks, salts, or other form contaminates picked up in the process of manufacture. The adsorbate may then be used wet as is, or dried, ground and stored for future use.

This adsorbate, containing vitamin G, can be treated with a liquid containing vitamin $B_1$, or any other water soluble vitamin which has the property of being adsorbed on fuller's earth. The resultant product is an adsorbate containing two or more water soluble vitamins of the B complex.

To make an adsorbate containing vitamin G in a higher concentration than is possible by adsorption of riboflavin from crude substances by clay, the following method may be employed. This enables a low potency adsorbate (50 to 250 gamma of riboflavin per gram) to be utilized in producing an adsorbate containing up to approximately 3000 gamma per gram. This material can be used as such or for making a combination adsorbate by an additional adsorbate with vitamin B, $B_6$, etc.

The adsorbate is elutriated with a suitable solvent such as 70% (60% to 90%) acetone, or with pyridine; 250 pounds of the adsorbate containing approximately 60 gamma of riboflavin, for example, are mixed with 500 gallons of 70% acetone in a ribbon type mixer. This mix is preferably made by adding approximately 100 gallons of acetone to the mixer; 250 pounds of clay are then added, and the mix is agitated until a uniform pasty consistency results. The balance of the acetone is then pumped into the mixer, after which it is agitated for two hours and then filtered. The filtrate is pumped back to a feed tank, and the cake is returned to the mixer.

The second extraction is made by adding 100 gallons of acetone to the mixer. Filter cake is added slowly so that it is broken up in the mixer. When the mix has a uniform pasty consistency, the balance of the acetone (about 150 gallons) is added and the mixture is agitated for two hours. A filter aid as Filter-cell can be added about 5 minutes before the material is pumped into the filter, to insure quick filtration. The second nitrate is pumped to the feed tank and the cake is discarded.

The acetone filtrate is then concentrated, in the absence of light. The still is operated to first drive off the acetone and then the water. When the elutriate from the treatment of about 1000 pounds of the clay has been passed into the still, it is concentrated down to as small a volume as possible and drained into a receiving tank. The still is then washed down with water and the wash is drained into the receiving tank. The material in the receiving tank is now concentrated under a vacuum to a volume of approximately 24 liters. The 24 liters is then filtered and the filtrate adsorbed on fuller's earth, the 24 liters requiring about 18½ pounds. The resulting earth will contain approximately 1500 gamma of vitamin G per gram. A second adsorption made from this liquid using 6 pounds of fuller's earth will give a potency of about 100 gamma of vitamin G per gram. The clay is finally separated from the liquid by filtration after which it is air dried and ground in a ball mill. Thereafter, the high potency adsorbate may be used as is or may be treated with a solution of vitamin $B_1$ or $B_6$ or both to make a combination adsorbate.

For example: 100 pounds of rice bran, or an equivalent amount of other cereal products containing vitamin $B_1$ (thiamine), is mixed with 500 pounds of water. When thorough mixing has been secured and sufficient time has been allowed for the thorough penetration of the material by the water, the solid material is then separated by passing the material through a suitable filtering device. It is desirable to maintain the temperature at approximately 125° F. during the mixing period.

The filtrate obtained from the mixture of bran and water carries a suspended solid content of a colloidal nature which is only difficultly separated. In fact centrifuging and pH adjustment are not effective and the only satisfactory way in which the solids can be caused to coalesce is by heating. The solids are preferably removed before treatment with the adsorbent. The filtrate is usually heated to a temperature between 60 and 100° C. Under these conditions the protein and comparable material in suspension is caused to coagulate and rise to the top of the liquid. The clear liquid can then be withdrawn from the bottom of the tank, leaving a cake of coagulated material. This clear liquid may now be used as a source of vitamins $B_1$, $B_6$, and the filtrate factors. The cake of coagulated material may either be washed to secure a better yield of vitamin B complex or may be discarded.

The dried and ground adsorbate containing lactoflavin is now contacted with the described liquid containing vitamin $B_1$, $B_6$, and an absorption of $B_1$ and $B_6$ occurs upon the adsorbate which contains lactoflavin. Thereafter, this clay now containing both vitamins adsorbed thereon is dried and ground. By suitably regulating the amounts of vitamin B per pound of adsorbate used, the amount of vitamin $B_1$ adsorbed upon the clay containing the lactoflavin can be regulated to provide wherever variation is desired.

I claim:

1. A method for producing a high potency vitamin adsorbate of low bulk comprising adsorbing on an adsorbent material a vitamin from a solution thereof, separating the adsorbent from the solution, drying the adsorbent, adsorbing a second vitamin on said adsorbent from a solution thereof, separating the adsorbent from the second solution and drying the same to provide a vitamin adsorbate having at least two vitamins in an amount greater than the vitamin content representing the saturation value of said adsorbent with respect to either one of the adsorbed vitamins.

2. A method for producing a vitamin adsorbate of high plural vitamin potency per unit volume comprising adsorbing on an adsorbent material vitamin G from a solution thereof, separating the adsorbent from the solution and adsorbing vitamin B thereon from a solution thereof to provide an adsorbent material bearing vitamins B and G in an amount greater than the vitamin content representing the saturation value of said adsorbent with respect to either vitamins B or G.

3. A method for producing a vitamin adsorbate of high plural vitamin potency per unit volume comprising adsorbing on an adsorbent material vitamin B from a solution thereof, separating the adsorbent from the solution and adsorbing vitamin G thereon from a solution thereof to provide an adsorbent material bearing vitamins B and G in an amount greater than the vitamin content representing the saturation value of said adsorbent with respect to either vitamins B or G.

4. The process as set forth in claim 2 wherein fuller's earth is used as the adsorbent.

5. The process as set forth in claim 2 wherein bentonite is used as the adsorbent.

6. The process as set forth in claim 3 wherein bentonite is used as the adsorbent.

HENRY A. SMITH.